UNITED STATES PATENT OFFICE.

FRITZ SALOMON, OF ESSEN-ON-THE-RUHR, GERMANY, ASSIGNOR TO FRIED. KRUPP, OF SAME PLACE.

PROCESS OF OBTAINING OXYGEN.

SPECIFICATION forming part of Letters Patent No. 440,777, dated November 18, 1890.

Application filed August 21, 1890. Serial No. 362,656. (No specimens.)

*To all whom it may concern:*

Be it known that I, FRITZ SALOMON, a subject of the Duke of Brunswick, residing at Essen-on-the-Ruhr, Prussia, Germany, have invented new and useful Improvements in Obtaining Oxygen Gas from Atmospheric Air, of which the following is a specification.

The process hitherto generally adopted for obtaining oxygen from atmospheric air is based upon the well-known property which spongy barium oxide possesses of absorbing oxygen at a red heat and of giving it off at a higher temperature, especially in a partial vacuum. This process, which has been very successfully carried out of late years by the Brothers Brin, is nevertheless subject to various defects which have prevented its general adoption and its being carried out on a large scale for industrial purposes.

The difficulty of producing spongy barium oxide, its relatively high price, the ease with which it is rendered useless by the application of too high heat, or by the formation of barium carbonate by the leakage of the retorts, &c., necessitate an exceedingly complicated apparatus to insure successful operation.

The process which forms the subject-matter of the present application is free from the above-mentioned defects and depends on the following chemical reactions:

When a mixture of lead monoxide (PbO) and of an alkaline earth is at a red heat brought into contact with a current of atmospheric air, oxygen is absorbed and lead dioxide ($PbO_2$) respectively, plumbate ($R_2PbO_4$) are formed. This chemical reaction is well known and has been clearly demonstrated by the researches of Dr. Kassner. If the lead compound be now brought into contact with carbonic-acid gas, the previously-absorbed atmospheric oxygen is driven off and a mixture of earthy alkaline carbonate and of lead monoxide is formed. The temperature at which the lead-oxide mixture absorbs atmospheric oxygen and at which carbonic acid drives the oxygen off are not far apart.

My process consists in heating a mixture of lead monoxide and alkaline earth—for instance, lime—to a good heat in a retort, so as to absorb oxygen from the atmospheric air. In place of lead monoxide other compounds of lead may be used—such as carbonate—which are transformed into monoxide by heat. The proportions of the constituent parts of the mixture may be varied; but it is desirable that for one equivalent of lead monoxide from one to two equivalents of lime should be present. The mixture is heated to a red heat, or to about 800° to 1000° centigrade. A current of atmospheric air is then passed over it, the oxygen of which is absorbed while the nitrogen escapes. When carbonate is used in place of monoxide, nitrogen and carbonic acid escape together. The absorption of the oxygen at the proper heat is soon completed, being effected through the admixture of lime as follows: $2CaO + PbO + O = Ca_2PbO_4$. After the saturation of the mixture with oxygen, when the temperature has fallen to a certain point, the current of air is turned off and carbonic-acid gas is passed over the glowing compound, whereby the oxygen is expelled while the carbonic acid combines with the remaining calcium oxide. The reaction is as follows: $Ca_2PbO_4 + 2CO_2 = 2CaCO_3 + PbO + O$. The oxygen driven off by this reaction is collected or carried off for immediate use. The reaction is so rapid that at first only pure oxygen is given off, so that it can be collected without difficulty. At the close of the operation some carbonic acid passes off, and this is easily removed by an absorbent, such as lime or sodium carbonate. The mixture of calcium carbonate and lead monoxide remaining in the retort after the expulsion of the oxygen is immediately treated with air while at a red heat, or to hasten the expulsion of the carbonic acid with a mixture of air and steam. The same reaction—namely, the absorption of oxygen by the mixture—is effected and the process may be repeated at pleasure. The regeneration of the mixture of the carbonate of an alkaline earth and of lead monoxide remaining in the retort after the expulsion of the oxygen has the advantage that it makes it possible to regain the greater part of the carbonic acid for future use.

Other metallic oxides than lead monoxide are applicable for obtaining oxygen by the above-described process—for instance, the lower oxides of manganese, which at a red heat form with oxygen the higher oxide of the metal combined with an alkaline earth, and which combinations are likewise decomposed by carbonic acid; but the expulsion of oxygen is not as readily effected as with the lead compounds. It is to be further remarked that both the oxygen of the pure dioxide—for example, $PbO_2$ (or $MnO_2$)—and of the corresponding metallic peroxide—for example, red lead ($PbO_2,PbO_4$)—is readily driven off by carbonic acid.

What I claim as my invention, and desire to secure by Letters Patent, is—

The herein-described process of obtaining oxygen from atmospheric air, which consists in heating a mixture of a metallic oxide, such as lead monoxide or lead carbonate, and of an alkaline earth, such as lime, in a current of air, so as to cause oxygen to be absorbed, and then driving off the oxygen by a current of carbonic-acid gas, substantially as specified.

In testimony whereof I have signed my name to this specification in the presence of two subscribing witnesses.

FRITZ SALOMON.

Witnesses:
FRITZ MOELLENHOFF,
EMIL BUSCH.

It is hereby certified that the name of the assignee in Letters Patent No. 440,777, granted November 18, 1890, upon the application of Fritz Salomon, of Essen-on-the Ruhr, Germany, for an improvement in "Process of Obtaining Oxygen," was erroneously written and printed "Fried. Krupp;" that said name should have been written and printed *the Firm Fried. Krupp;* and that said Letters Patent should be read with this correction therein that the same may conform to the record of the case in the Patent Office.

Signed, countersigned, and sealed this 23d day of December, A. D. 1890.

[SEAL.]
                  CYRUS BUSSEY,
                  *Assistant Secretary of the Interior.*

Countersigned:
 C. E. MITCHELL,
  *Commissioner of Patents.*